INVENTORS
WALTER M. DOYLE
MATTHEW B. WHITE
BY Leonar Galman
ATTORNEY

United States Patent Office 3,517,330
Patented June 23, 1970

3,517,330
FREQUENCY STABILIZATION OF LASER SYSTEM WHICH COMPARES THE AMPLITUDES OF TWO BEAT NOTE SIGNALS
Walter M. Doyle, Laguna Beach, and Matthew B. White, Newport Beach, Calif., assignors to Philco-Ford Corporation, Philadelphia, Pa., a corporation of Delaware
Filed Nov. 9, 1966, Ser. No. 593,212
Int. Cl. H01s 3/00
U.S. Cl. 331—94.5                                5 Claims

ABSTRACT OF THE DISCLOSURE

A frequency stabilized laser system in which a transducer coupled to one of the reflectors of the system is controlled, by a signal having a value dependent on the difference in amplitude of two beat note signals obtained from respective pairs of laser oscillation signals to maintain the spacing of the reflectors at a constant distance, thereby to maintain the oscillation signals at a constant frequnecy. A laser discharge tube shaped so as to permit generation of a plurality of oscillation signals which have respectively different frequencies and different planes of polarization, and a light transmissive means exhibiting a signal-controlled anisotropy are disposed between the reflectors to produce at least three oscillation signals of respectively different frequencies and of desired polarizations. Pairs of these signals of like polarization are heterodyned to produce two beat note signals which are rectified and then supplied to a differential amplifier having its output coupled to the transducer. When the respective amplitudes of the two beat note signals differ, a correction signal having a value directly dependent on this amplitude difference is supplied to the transducer which, in response to this correction signal, changes the distance between the reflectors in a sense tending to minimize the value of the correction signal.

---

The present invention relates to a laser system and more particularly to frequency stabilization of a continuous wave dual polarization gas laser of the type described in applicants' copending U.S. patent application Ser. No. 475,757, field July 29, 1965.

Existing lasers have not provided an output signal that possesses the long-term frequency stability necessary for practical applications of laser technology. The lack of long-term frequency stability is primarily due to mechanical instability of the laser cavity dimensions, brought about by minute vibrations and thermal expansion.

The laser cavity resonates in many modes because the dimensions of the cavity are considerably larger than the wavelength of any signal within the optical range. The number of modes produced and the spacing between the modes produced are directly related to the length of the laser cavity. Minute laser cavity changes can cause a shift in the frequency of the existing modes and the production of new laser modes.

Several methods have previously been proposed for providing a laser output signal that possesses long-term frequency stability. These methods have involved the locking of the frequencies of conventional Brewster-window type gas lasers to selected positions on the fluorescence profile of the gas used in the laser. One method that has been employed entails the generation of a cavity length correction signal by analysis of the amplitude modulation of the laser output signal resulting from an induced small oscillatory variation of the optical cavity length. In another method, stabilization is achieved by servo-locking the frequency of one laser to the average frequency of another laser which has been stabilized using the method previously mentioned. These methods have produced moderate frequency stability but each requires complex electronic circuitry.

It is an object of the present invention to provide a laser system having long-term frequency stability.

Another object of the present invention is to provide a dual polarization gas laser system in which long-term frequency stability is achieved by using a feedback signal to regulate the length of the laser cavity.

A further object is to provide a system for stabilizing the frequency of a laser by comparison of the amplitudes of various modes of oscillation present therein.

In general, these and other objects of the present invention are achieved by a laser system comprising two or more reflectors which establish a closed optical path therebetween, the reflectors being separated by a given distance, a discharge tube disposed in said path and shaped so as not to favor a particular axial mode of oscillation, optical transmissive means introducing anisotropy of known characteristics in response to an applied signal disposed in said path of optical energy between said reflectors, electro-mechanical transducer means coupled to one of the reflectors in a manner to control the length of the optical path defined by the reflectors, means for generating a signal having an amplitude dependent upon the amplitudes of a plurality of modes of oscillation in the laser and means for supplying the last mentioned signal to the transducer means to maintain a fixed spacing between the two reflectors.

For a better understanding of the present invention together with other and further objects thereof, reference should now be had to the following detailed description which is to be read in conjunction with the accompanying drawings in which.

Figure 1:
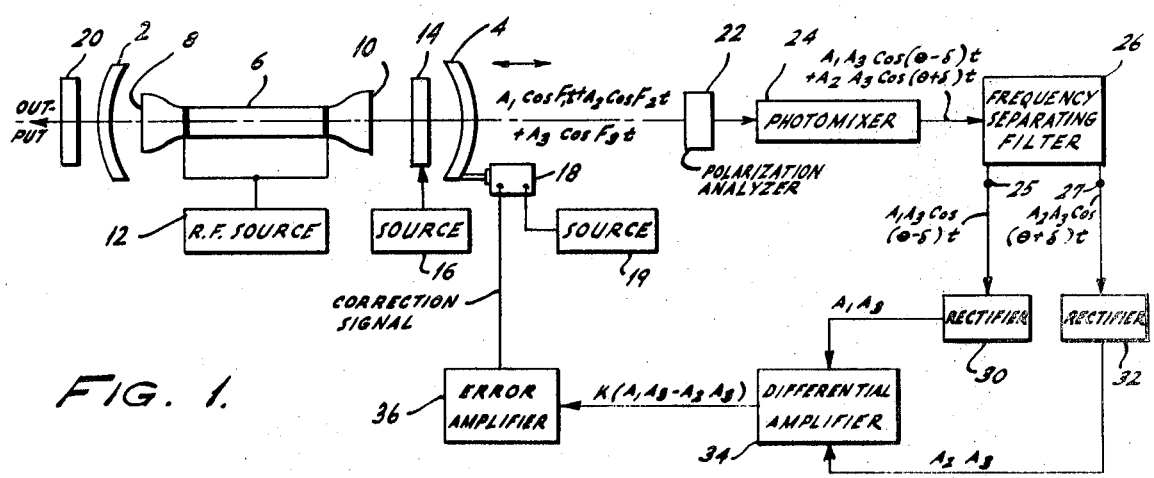
FIG. 1 is a schematic diagram of one embodiment of the present invention.

In FIG. 1 two confocal spherical reflectors 2 and 4 define the ends of an optical path extending therebetween. A laser tube 6 is disposed in said path. Typically laser tube 6 may comprise a plasma tube having fused silica end windows 8 and 10 which are normal or nearly normal to the optical path between reflectors 2 and 4. Each end window 8 and 10 may be anti-reflection coated if necessary in order to reduce optical losses within the laser system. Windows 8 and 10 may be oriented at a slight angle to the normal, i.e., displaced by a few degrees, for example 2°, from the normal in order to minimize resonances between the two windows 8 and 10 as a result of partial reflections therefrom. Plasma tube 6 may include a mixture of helium and neon and conveniently the system may operate at the 1.15 micron He-Ne transition. The internal surface of plasma tube 6 may be roughened or frosted to minimize specular reflection from the walls of tube 6.

A conventional RF pumping source 12 may be coupled to plasma tube 6 in a conventional manner.

Block 14 represents schematically an optical transmissive device which is arranged to introduce an optical anisotropy into the optical path between reflectors 2 and 4. In the case of a communication system, device 14 may comprise, for example, a Kerr cell or Pockels cell which introduces a known anisotropy in response to an electrical signal supplied thereto from source 16.

Reflector 4 is mounted on or is formed in the end of an electromechanical transducer 18, such as, for example, a piezoelectric transducer. A constant amplitude voltage source 19 is connected to transducer 18. The length of transducer 18 parallel to the optical axis of the laser is a function of the amplitude of the voltage supplied by source 19 and the amplitude of the correction signal supplied thereto by error amplifier 36. Thus transducer 18 drives reflector 4 along the optical axis of the laser in response to the correction signal supplied thereto by error amplifier 36.

Reflectors 2 and 4 are slightly transmissive so that some energy exits through these reflectors and passes through polarization analyzers 20 and 22, respectively. Polarization analyzers 20 and 22 may be Nicol prisms. The energy that exits through reflector 20 constitutes the output of the laser system.

The light passing through analyzer 22 is intercepted by a photomixer 24 which may be a conventional photodiode such as a PbS or an InAs photodetector. The output signal from photomixer 24 is supplied to a frequency separating filter 26. Filter 26 has two output ports 25 and 27 which are coupled to rectifiers 30 and 32, respectively. Rectifiers 30 and 32 contain bypass capacitors so that their output signals are unidirectional. The output signals from rectifiers 30 and 32 are supplied to a differential amplifier 34, the output of which is coupled through an error amplifier 36 to the electro-mechanical transducer 18.

When an electrically induced field is applied across device 14 by source 16, the only stationary modes that can be established involve light plane-polarized either perpendicular to or parallel to the field direction established by the source 16. Light polarized in any other manner cannot simultaneously maintain its polarization state and fulfill the condition for constructive interference necessary for a stationary mode.

The beam having a polarization parallel to the direction of the field will have a velocity through the element 14 which is different from the velocity of the beam having a polarization perpendicular to this field. This difference in velocity will result in a difference in effective path length of the two beams and hence a difference in frequency between the beam polarized parallel to the field and the beam polarized perpendicular to the field.

Figure 2:
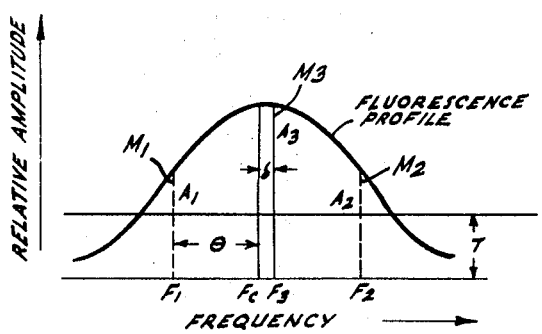
FIG. 2 is a graph showing the frequency relationship of selected laser modes to the fluorescence profile of the gas used in the laser system of FIG. 1.

The operation of the frequency stabilization system of FIG. 1 will now be more fully explained in conjunction with FIG. 2 which includes a graph of the fluorescence profile of a typical gas that can be used in the plasma tube 6 of FIG. 1. The fluorescence profile of a gas indicates the frequencies at which the gas will emit light energy and the relative amplitude of the light emitted at each frequency. In the graph of FIG. 2, the center frequency of the fluorescence profile $F_c$ indicates the frequency at which the light energy emitted from the gas has a maximum value and the amplitude T indicates the amplitude below which a mode in a particular laser will cease oscillation.

By utilizing a weakly birefringent element 14 and properly choosing the degree of output coupling, i.e., the transmissivity of reflectors 2 and 4, oscillations in the laser cavity defined by reflectors 2 and 4 are restricted to one large amplitude mode near the center of the fluorescence profile and two much smaller amplitude modes near the ends of the fluorescence profile. These smallers amplitude modes have a polarization different from that of the large amplitude mode, i.e. in quadrature with the large amplitude mode. Referring to FIG. 2, the large amplitude mode is indicated as $M_3$. Mode $M_3$ has an amplitude $A_3$ and a frequency $F_3$ which is displaced from the center frequency of the fluorescence profile $F_c$ by a frequency difference $\delta$. The frequency difference $\delta$ is due to the birefringence of device 14. The two smaller amplitude modes are indicated as $M_1$ and $M_2$. Modes $M_1$ and $M_2$ have amplitudes $A_1$ and $A_2$, respectively, and frequencies $F_1$ and $F_2$, respectively.

When the three component signal from the laser cavity (indicated as $$A_1 \cos F_1 t + A_2 \cos F_2 t + A_3 \cos F_3 t$$

in FIG. 1) is supplied to the photomixer 24, photomixer 24 optically heterodynes the incoming signal to produce an output signal having two components of different frequency. The frequency of each component is a difference frequency beat note corresponding to beats between the differently polarized signals. That is, one polarization mode $M_3$ near the center of the system band-pass beats with each of the differently polarized modes $M_1$ and $M_2$ near the ends of the band-pass to produce two difference frequency beat notes, $$A_1 A_3 \cos (\theta - \delta) t$$

and $$A_2 A_3 \cos (\theta + \delta) t$$

in which the fundamental mode spacing is determined by the spacing of reflectors 2 and 4 and is represented by $\theta$.

Filter 26 divides the output of the photomixer 24 into its two difference frequency beat note components and supplies the lower frequency component to rectifier 30 and the higher frequency component to rectifier 32. Rectifier 30 rectifies the lower frequency component to produce a unidirectional signal having an amplitude $A_1 A_3$ and rectifier 32 rectifies the higher frequency component to produce a unidirectional signal having an amplitude $A_2 A_3$.

When the positioning of the cavity modes on the fluorescence profile is such that the beat note amplitudes are equal (i.e., $A_1 A_3 = A_2 A_3$), a null output voltage from the differential amplifier 34 of FIG. 1 results, and the voltage applied to the electro-mechanical transducer 18 remains constant. If, on the other hand, thermal expansion of the cavity or some other perturbation causes the frequency of the cavity modes to drift, the relative amplitudes of modes $M_1$, $M_2$ and $M_3$ will change. This will cause the relative amplitudes of the two beat notes to change and as a result thereof a correction signal will appear at the output of the differential amplifier 34. This signal is supplied to the transducer 18 which regulates the laser cavity length by driving reflector 4 along the optical axis of the laser. The movement of reflector 4 maintains the laser cavity length constant and hence maintains the laser mode frequencies constant.

Figure 3:
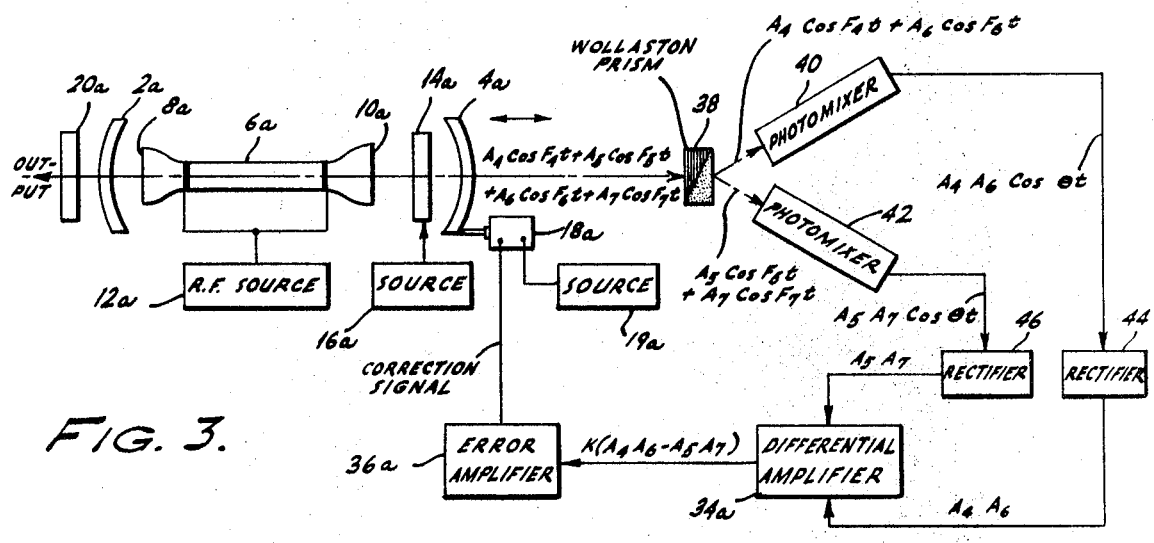
FIG. 3 is a schematic diagram of another preferred embodiment of the present invention.

FIG. 3 is a second preferred embodiment of the present invention in which parts corresponding to like parts in FIG. 1 have been identified by the same reference numerals with the suffix $a$. In FIG. 3 the signal passing through reflector 4a is intercepted by a Wollaston prism 38 which spatially separates the differently polarized components contained in the signal. One of the two spatially separated components is supplied to a photo-mixing detector 40 and the other component is supplied to a photo-mixing detector 42. The outputs of detectors 40 and 42 are supplied through rectifiers 44 and 46, respectively, to a differential amplifier 34a. The output of amplifier 34a is supplied by means of an error amplifier 36a to electro-mechanical transducer 18a.

Figure 4:
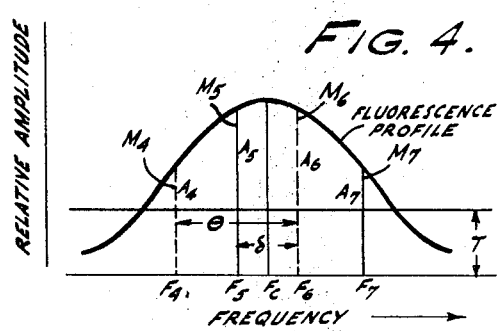
FIG. 4 is a graph showing the frequency relationship of selected laser modes to the fluorescence profile of the gas used in the laser system of FIG. 3.

By positioning a strongly birefringent element 14a inside the laser cavity of FIG. 3 and by properly adjusting the laser output coupling, the mode structure shown in FIG. 4 is obtained. In FIG. 4, quantities corresponding to like quantities appearing in FIG. 2 have been identified by the same symbol. The mode structure of FIG. 4 contains two larger amplitude modes $M_5$ and $M_6$ of different (i.e. quadrature) polarization and two smaller amplitude modes $M_4$ and $M_7$ of different polarization.

When the output signal from the laser cavity of FIG. 3 (indicated as $$A_4 \cos F_4 t + A_5 \cos F_5 t + A_6 \cos F_6 t + A_7 \cos F_7 t$$

in FIG. 3) is supplied to Wollaston prism 38, the prism spatially separates the laser modes of different polarization and supplies modes $M_4$ and $M_6$ to photomixer 40 and modes $M_5$ and $M_7$ to photomixer 42. Photomixer 40 optically heterodynes modes $M_4$ and $M_6$ to produce a difference frequency beat note $A_4 A_6 \cos \theta t$. and photomixer 42 optically heterodynes modes $M_5$ and $M_7$ to produce a difference frequency beat note $A_5 A_7 \cos \theta t$. Rectifiers 44 and 46 rectify the output signals from photomixers 40 and 42 to produce unidirectional signals having amplitudes $A_4 A_6$ and $A_5 A_7$, respectively.

When the positioning of the cavity modes $M_4$, $M_5$, $M_6$ and $M_7$ on the fluorescence profile is such that the beat note amplitudes of the difference signals from photomixers 40 and 42 are equal (i.e., $A_4 A_6 = A_5 A_7$), a null output signal from the differential amplifier 34a of FIG. 3 results, and the voltage applied to the transducer 18a remains constant. This will occur when modes $M_5$ and $M_6$ are approximately symmetrically positioned with respect to the center line of the fluorescence profile $F_c$. If, on the other hand, thermal expansion of the cavity or similar perturbation causes the positions of the cavity modes to shift, the relative amplitudes of the two beat notes ($A_4 A_6$ and $A_5 A_7$) will change and a correction signal will appear at the output of the differential amplifier 34a. This signal is used to adjust the laser cavity length by regulating the voltage supplied to the transducer 18a so as to compensate for the frequency drift and maintain the locking condition, $A_4 A_6 = A_5 A_7$.

From the foregoing discussion, it is apparent that the optical intensities of the beams that exit from the laser cavity can be used directly to generate a correction signal. That is, the amplitudes of the modes may be compared directly rather than comparing the amplitude of beats between selected modes. For example, photomixers 40 and 42 may be replaced by photocells. Each photocell would have its output signal supplied to a differential amplifier, such as differential amplifier 34a of FIG. 3. Since the optical intensity of a laser mode is dependent upon its position with respect to the center frequency of the fluorescence profile $Fc$, the amplitude of the signal from each photocell will indicate the approximate positions of the laser modes of each polarization on the fluorescence profile. If the corresponding laser modes of each polarization (i.e. $M_5 M_7$ and $M_4 M_6$) are not equally spaced from the center frequency of the fluorescence profile $Fc$, a correction signal will appear at the output of the differential amplifier 34a. Although this modified system does not have the sensitivity of the system of FIG. 3, its modest electronic requirements might nevertheless make it appropriate for use in a system not requiring maximum frequency stabilization.

Assuming that differential amplifier 34 or 34a requires an output equal to only $1 \times 10^{-4}$ of its maximum output (i.e. the output with one input at zero signal level) to produce a correction signal to transducer 18 or 18a, a He–Ne laser operating at 6328 A. and having a mode spacing $\theta$ of 500 megacycles per second will have a long-term frequency stability of approximately ±3.34 kilocycles per second or about one part in $10^{11}$.

From the foregoing discussion it can be seen that the systems of the present invention provide frequency stabilization utilizing relatively simple electronic arrangements. In addition to the relatively simple electronic arrangements necessary to provide frequency stabilization, the system of the present invention can also determine the direction as well as the magnitude of the laser cavity length drift. This is achieved by measuring the amplitude of the correction signal from differential amplifiers 34 or 34a or by measuring the output frequencies from the filter 26 of FIG. 1.

Whlie there has been described what are at present considered to be the preferred embodiments of the present invention, it will be apparent that various modifications and other embodiments within the scope of the invention will occur to those skilled in the art.

We claim:

1. A laser system comprising a plurality of reflectors positioned to define a closed optical path, at least one of said reflectors being partially transmissive to permit optical energy to exit said path, a laser plasma tube positioned between a pair of said reflectors with its longitudinal axis substantially coincident with said path, said plasma tube being shaped so as to permit generation of a plurality of oscillation signals which have respectively different frequencies and different planes of polarization, first means for pumping said plasma tube, light transmissive means positioned in said optical path, said light transmissive means exhibiting a signal controlled anisotropy whereby only oscillation signals having mutually orthogonal planes of polarization can exist in said path, second means disposed in the path of optical energy exiting said path for optically heterodyning different groups of said oscillation signals to produce an output signal comprising at least two difference frequency beat note signals, third means supplied with said output signal for comparing the ampltiudes of said two beat note signals and generating a frequency correction signal when said amplitudes of said two beat note signals are different, and fourth means responsive to said frequency correction signal to change the effective length of said closed optical path in such manner as to minimize the difference between said amplitudes of said beat note signals.

2. A laser system according to claim 1 wherein said second means comprises a photomixing detector and also comprises a polarization analyzer positioned intermediate said detector and said partially transmissive reflector, said third means comprises a frequency separating filter having at least two output terminals, a differential amplifier having two input terminals, a first rectifier coupling one of said output terminals of said filter to one of the input terminals of said differential amplifier, and a second rectifier coupling the other output terminal of said filter to the other input terminal of said differential amplifier, and said fourth means comprises a transducer coupled to one of said reflectors and responsive to the output signal of said differential amplifier to move said coupled reflector.

3. A laser system according to claim 2 wherein said transducer is an electro-mechanical transducer.

4. A laser system according to claim 1 wherein said second means comprises two photomixing detectors and fifth means positioned intermediate said detectors and said partially transmissive reflector for spatially separating oscillation signals of different polarization and directing oscillation signals of one polarization to one of said photomixing detectors and energy of another polarization to the other photomixing detectors; said third means comprises first and second rectifiers and a differential amplifier, the output of said one detector being coupled through said first rectifier to a first input terminal of said differential amplifier and the output of said other detector being coupled through said second rectifier to a second input terminal of said differential amplifier; and said fourth means comprises a transducer coupled to one of said reflectors and responsive to the output signal of said differential amplifier to move said coupled reflector.

5. The system of claim 4 wherein said fifth means comprises a Wollaston prism.

(References on following page)

References Cited

UNITED STATES PATENTS

| | | | |
|---|---|---|---|
| 3,170,122 | 2/1965 | Bennett | 331—94.5 |
| 3,395,365 | 7/1968 | Fork | 331—94.5 |

OTHER REFERENCES

Goldick: "Frequency Stabilization of Double Mode Lasers," Proc. IEEE, vol. 53, p. 638, June 1965.

Polonyi et al.: "Frequency Stabilization of a Gas Laser," IEEE Jour. of Quantum Electronics, vol. QE-2, pp. 178-9, July, 1966.

White et al.: "Frequency Stabilization of Single Mode Gas Lasers," Applied Physics Letters, vol. 5, pp. 97-98, September, 1964.

RONALD L. WIBERT, Primary Examiner

E. BAUER, Assistant Examiner